United States Patent
Tsuchiya

(10) Patent No.: US 9,963,130 B2
(45) Date of Patent: May 8, 2018

(54) DEVICE FOR DETECTING AMOUNT OF OPERATION OF OPERATION MEMBER AND ELECTRONIC PARKING BRAKE CONTROL UNIT PROVIDED WITH THE DEVICE

(71) Applicant: HONDA MOTOR CO., LTD., Minato-Ku, Tokyo (JP)

(72) Inventor: Naoki Tsuchiya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days. days.

(21) Appl. No.: 15/113,269

(22) PCT Filed: Jan. 19, 2015

(86) PCT No.: PCT/JP2015/000201
§ 371 (c)(1),
(2) Date: Jul. 21, 2016

(87) PCT Pub. No.: WO2015/111396
PCT Pub. Date: Jul. 30, 2015

(65) Prior Publication Data
US 2017/0008499 A1 Jan. 12, 2017

(30) Foreign Application Priority Data
Jan. 27, 2014 (JP) .................................. 2014-012227

(51) Int. Cl.
*B60T 8/171* (2006.01)
*B60T 7/04* (2006.01)
(Continued)

(52) U.S. Cl.
CPC .............. *B60T 8/171* (2013.01); *B60K 23/02* (2013.01); *B60K 26/04* (2013.01); *B60T 7/04* (2013.01);
(Continued)

(58) Field of Classification Search
CPC ........... B60K 23/02; B60K 26/04; B60T 7/04; B60T 7/042; B60T 7/06; B60T 13/741; B60T 8/171; G05G 1/30
(Continued)

(56) References Cited

U.S. PATENT DOCUMENTS 5,176,234 A * 1/1993 Reik ...................... B60W 10/02
192/53.2
6,679,362 B2 * 1/2004 Berger .................. F16D 29/005
192/142 R
(Continued)

FOREIGN PATENT DOCUMENTS

JP S59-097325 A 6/1984
JP H10-103090 A 4/1998
(Continued)

*Primary Examiner* — Atul Trivedi
(74) *Attorney, Agent, or Firm* — Carrier Blackman & Associates, P.C.; Joseph P. Carrier; William D. Blackman

(57) ABSTRACT

A device includes: a storage that stores detection values of a position detector when an operation member is at a start point position and when the operation member is at an end point position as a start point detection value and an end point detection value, respectively; an operation amount computing section that, based on a difference between the detection value of the position detector and the start point detection value, computes an operation amount of the operation member; and a correction section that, when the detection value falls below the start point detection value, corrects the start point detection value by adding thereto a deviation value of the detection value from the start point detection value, and when the detection value exceeds the end point detection value, corrects the start point detection value by adding thereto a deviation of the detection value from the end point detection value.

6 Claims, 7 Drawing Sheets

(51) Int. Cl.
  *B60K 23/02* (2006.01)
  *B60T 13/74* (2006.01)
  *B60K 26/04* (2006.01)
  *G05G 1/30* (2008.04)
  *B60T 7/06* (2006.01)
(52) U.S. Cl.
  CPC ............. *B60T 7/042* (2013.01); *B60T 7/06* (2013.01); *B60T 13/741* (2013.01); *G05G 1/30* (2013.01)
(58) Field of Classification Search
  USPC .......................................................... 701/70
  See application file for complete search history.

(56) References Cited

U.S. PATENT DOCUMENTS

| | | | |
|---|---|---|---|
| 9,434,364 B2* | 9/2016 | Terasaka | B60T 7/042 |
| 2001/0037927 A1* | 11/2001 | Nagler | F16D 25/14 |
| | | | 192/85.63 |
| 2002/0086769 A1* | 7/2002 | Hemmingsen | F16D 48/068 |
| | | | 477/79 |
| 2002/0185351 A1* | 12/2002 | Berger | F16D 29/005 |
| | | | 192/30 R |
| 2004/0231951 A1* | 11/2004 | Hasegawa | B60T 7/12 |
| | | | 192/220 |
| 2008/0071456 A1* | 3/2008 | Shiraki | B60T 7/122 |
| | | | 701/70 |
| 2008/0182720 A1* | 7/2008 | Kobayashi | F16D 25/086 |
| | | | 477/175 |
| 2012/0259524 A1* | 10/2012 | Miyazaki | B60W 50/10 |
| | | | 701/70 |

FOREIGN PATENT DOCUMENTS

| | | |
|---|---|---|
| JP | H11-180271 A | 7/1999 |
| JP | 2002-106407 A | 4/2002 |
| JP | 2012-081918 A | 4/2012 |

* cited by examiner

DEVICE FOR DETECTING AMOUNT OF OPERATION OF OPERATION MEMBER AND ELECTRONIC PARKING BRAKE CONTROL UNIT PROVIDED WITH THE DEVICE

TECHNICAL FIELD

The present invention relates to a device for detecting an operation amount of an operation member, which can correct a start point detection value when the operation member is at a start point position and an electronic parking brake control unit provided with the device.

BACKGROUND ART

An accelerator pedal, a brake pedal, a clutch pedal or the like may be provided with an operation amount sensor for detecting an operation amount of the pedal. The detection value detected by the operation amount sensor is converted to an operation amount of the pedal by a computing device based on a difference between the detection value and a start point detection value, which is a detection value when the pedal is at a start point position.

The start point detection value may be set to a uniform value prior to assembly of the pedal and the operation amount sensor at the factory, or may be set based on the detection value detected by the operation amount sensor after the assembly. Though the start point detection value has been set at the time of shipping from the factory, the start point detection value may be shifted due to deterioration of the pedal and the sensor over time (such as wear or positional displacement) as the pedal operation is performed repeatedly during use. For this reason, there is a computing device configured to update the start point detection value at appropriate times based on the detection value after setting of the start point detection value.

As a minimum value (start point detection value) updating method for an accelerator pedal device for updating the start point detection value, a method is known in which when the output value from an accelerator pedal sensor has shown a value less than a currently stored minimum value by a predetermined value or more within a predetermined variation range for a certain period of time continuously or has shown a value greater than the currently stored minimum value by a predetermined value or more within a predetermined variation range for a certain period of time continuously, the minimum value is updated based on the sensor output value at that time (Patent Document 1).

PRIOR ART DOCUMENT (S)

Patent Document (s)

Patent Document 1: JPH10-103090A

BRIEF SUMMARY OF THE INVENTION

Task to be Accomplished by the Invention

However, in the method described in Patent Document 1, in a case where the detection value of the sensor when the pedal is at the start point position has continued to be less than the start point detection value (on the side opposite to the operation direction), it is possible to determine easily that this was caused by a shift of the start point detection value, but if the detection value of the sensor when the pedal is at the start point position has continued to be greater than the start point detection value (on the side in the operation direction), it is not possible to definitely determine whether this was caused by a driver's depressing operation or the like or by a shift of the start point detection value. Therefore, the start point detection value might be updated based on an erroneous determination.

In view of such a background, a task to be accomplished by the present invention is to provide a device for detecting an operation amount of an operation member and an electronic parking brake control unit provided with the device for detecting an operation amount, such that, even when the start point detection value is shifted relative to the set value in the operation direction, the device can distinguish the shifting from a phenomenon caused by a driver's operation or the like and correct the start point detection value.

Means to Accomplish the Task

To accomplish such a task, the present invention provides a device (1) for detecting an operation amount of an operation member, comprising: an operation member (2) provided so as to be moveable within a fixed operation range from a start point position to an end point position; a position detector (15) that outputs a detection value (V) varying in accordance with a position of the operation member; a storage section (24) that stores the detection values of the position detector when the operation member is at the start point position and when the operation member is at the end point position as a start point detection value (Vmin) and an end point detection value (Vmax), respectively; an operation amount computing section (23) that, based on a difference ($\Delta V$) between the detection value of the position detector and the start point detection value, computes an operation amount (Sp) of the operation member; and a start point detection value correction section (25) that, when the detection value of the position detector falls below the start point detection value (step ST3: Yes), corrects the start point detection value by adding thereto a deviation value (Vd) of the detection value from the start point detection value (step ST5), and when the detection value of the position detector exceeds the end point detection value (step ST6: Yes), corrects the start point detection value by adding thereto a deviation value (Vd) of the detection value from the end point detection value (step ST9).

Here, correction "by adding a deviation value" is not limited to correction by adding the deviation value as it is, but may include correction by adding a value obtained based on the deviation value, e.g., a value obtained by multiplying the deviation value by a predetermined coefficient. According to this configuration, it is possible to not only correct the start point detection value in a case where the detection value of the position detector when the operation member is at the start point position is shifted relative to the start point detection value in the direction opposite to the operation direction, but also correct the start point detection value in a case where the detection value is shifted in the operation direction by use of a deviation value of the detection value from the end point detection value, while distinguishing the shifting from a phenomenon caused by a driver's operation or the like.

Further, in the above-mentioned invention, a configuration may be made such that when the detection value of the position detector exceeds the end point detection value (step ST6: Yes), the start point detection value correction section regards the operation from when the detection value of the position detector exceeds the end point detection value to when the detection value returns to near the start point detection value as a single operation, and limits the deviation value (Vd) to be added to the start point detection value that is corrected following the single operation to a predetermined limit value (Vlim) (step ST10).

According to this configuration, in a case where the detection value of the position detector when the operation member is at the start point position is shifted in the operation direction by more than the limit value, the start point detection value is corrected gradually with each single operation. This avoids a situation that when the detection value of the position detector is affected by noise or the like, the start point detection value is corrected rapidly in the operation direction with a single operation such that an operation near the start point position becomes unable to be recognized when the next operation is performed.

Further, in the above-mentioned invention, a configuration may be made such that when the detection value of the position detector falls below the start point detection value (step ST3: Yes), the start point detection value correction section corrects the start point detection value without limiting the deviation value (Vd) to be added thereto (step ST5).

In the case where the detection value of the position detector falls below the start point detection value, this is considered to be caused by a shift at an early stage due to an arrangement or the like of the operation member and the position detector, rather than caused by influence of noise. By correcting the start point detection value directly with the deviation value without limiting the deviation value (Vd) to be added, it is possible to quickly correct the early-stage shift of the start point detection value.

Further, in the above-mentioned invention, a configuration may be made such that when the detection value of the position detector falls below the start point detection value by more than a predetermined failure determination value (Ver) (step ST4: No) and when the detection value of the position detector exceeds the end point detection value by more than a predetermined failure determination value (Ver) (step ST7: No), the start point detection value correction section does not correct the start point detection value and maintains the same.

According to this configuration, when an abnormal deviation value exceeding the failure determination value is detected due to some sort of failure of the position detector, the correction of the start point detection value is not performed. Thereby, correction based on the abnormal detection value is avoided, and operability when the position detector is in failure is ensured.

Further, in the above-mentioned invention, a configuration may be made such that the operation member consists of a clutch pedal (2); the position detector consists of a stroke sensor (15) for detecting a stroke (Sp) of the clutch pedal; the clutch pedal comprises a pedal arm (8) provided so as to be pivotable about a pedal pivot shaft (7) and a pedal part (6) provided at a free end portion of the pedal arm and to be operated by a driver; and the stroke sensor comprises a sensor lever (17) provided so as to be pivotable about a sensor pivot shaft (16) disposed in parallel with the pedal pivot shaft at a position apart from the pedal pivot shaft such that the sensor lever pivots in accordance with pivoting of the pedal arm, and a rotation angle sensor (18) for detecting a pivoting angle of the sensor lever.

The clutch pedal is frequently operated to the end point position. Thus, according to this configuration, it is possible to not only correct the start point detection value in a case where the detection value of the stroke sensor when the clutch pedal is at the start point position is shifted relative to the start point detection value in the direction opposite to the operation direction, but also correct the start point detection value frequently when the detection value is shifted relative to the start point detection value in the operation direction, on the basis of the deviation value of the detection value from the end point detection value. Thereby, the stroke of the clutch pedal can be detected accurately.

In addition, to accomplish the above-mentioned task, the present invention provides an electronic parking brake control unit, comprising: the device (1) for detecting an operation amount of an operation member (2) described above; and an electronic parking brake control section (22) that drive-controls an electronic parking brake device based on at least the stroke of the clutch pedal detected by the stroke sensor, wherein the electronic parking brake control section turns off the electronic parking brake device on the basis of the stroke of the clutch pedal.

According to this configuration, the device for detecting an operation amount not only can correct the start point detection value in the case where the detection value of the stroke sensor when the clutch pedal is at the start point position is shifted relative to the start point detection value in the direction opposite to the operation direction, but also can correct the start point detection value in the case where the detection value is shifted relative to the start point detection value in the operation direction, on the basis of the deviation value of the detection value from the end point detection value. Thereby, it is possible to turn off the electronic parking brake device at an appropriate timing based on an accurate stroke of the clutch pedal.

Effect of the Invention

Thus, according to the present invention, it is possible to provide a device for detecting an operation amount of an operation member and an electronic parking brake control unit provided with the device, such that, even when the start point detection value is shifted relative to the initially set value in the operation direction, the device can distinguish the shifting from a phenomenon caused by a driver's depressing operation and correct the start point detection value.

EMBODIMENTS FOR CARRYING OUT THE INVENTION

In the following, an embodiment of the present invention will be described in detail with reference to the drawings.

Figure 1:
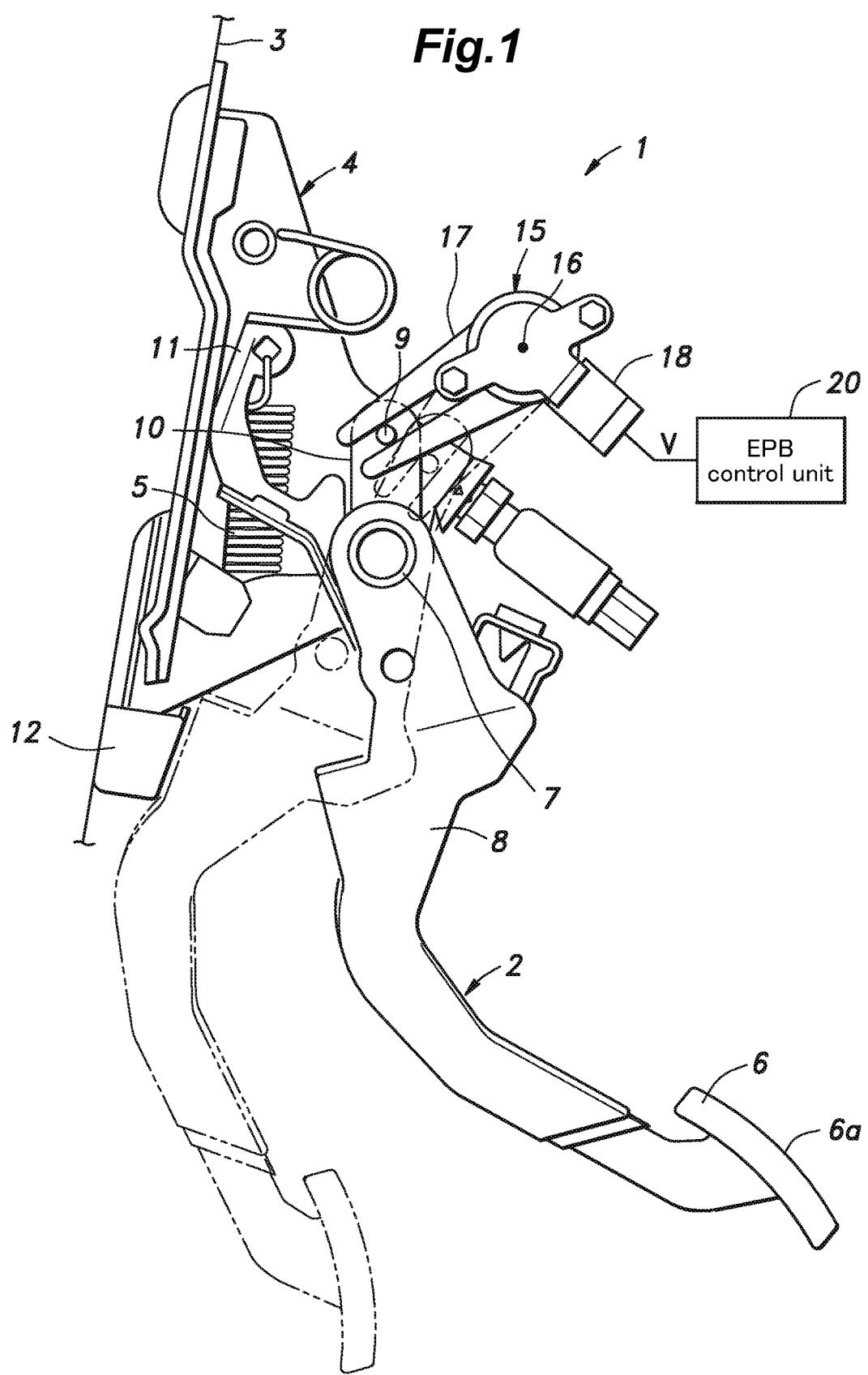
FIG. 1 is a side view of a clutch pedal according to an embodiment.

As shown in FIG. 1, a clutch pedal unit 1 is located on the floor in front of the driver's seat of a motor vehicle. The clutch pedal unit 1 includes a clutch pedal 2 provided so as to be pivotable within a fixed operation range between a start point position (original position or minimum operation position) shown by solid lines and an end point position (maximum operation position) shown by imaginary lines and to be operated by a driver, a base portion 4 that is fastened to a vehicle body 3 and pivotably supports the clutch pedal 2, and a tension coil spring 5 serving as a biasing member that biases the clutch pedal 2 toward the start point position.

The clutch pedal 2 includes a pedal arm 8 having a pedal pivot shaft 7 and pivotable about the pedal pivot shaft 7, and a pedal part 6 provided at a free end of the pedal arm 8 and having a pedal surface 6a which is to be depressed by the driver. The pedal arm 8 extends downward from the pedal pivot shaft 7. The pedal arm 8 is provided with a sensor arm 10 extending upward from the pedal pivot shaft 7 and having a pin 9 formed integrally in its upper portion such that the pin 9 extends in parallel with the pedal pivot shaft 7, and a biasing arm 11 extending from the pedal pivot shaft 7 obliquely upward in the forward direction and having an upper potion engaged with one end of the tension coil spring 5, in such a manner that these arms rotate integrally. The tension coil spring 5 extends downward from the one end thereof engaged with the biasing arm 11, and the other end thereof is engaged with the base portion 4.

When the clutch pedal 2 is located at the start point position, the biasing arm 11 abuts on the base portion 4. Namely, the pivoting of the clutch pedal 2 toward the start point position under the biasing force of the tension coil spring 5 is restricted by the base portion 4. A lower part of the base portion 4 is provided with a stopper 12 for restricting the pivoting of the clutch pedal 2 in the operation direction thereof at the end point position. Almost each time the clutch pedal 2 is operated, the clutch pedal 2 is operated to the end point position where the pedal arm 8 abuts on the stopper 12, and further pivoting in the operation direction is restricted by the stopper 12.

Provided above the clutch pedal 2 is a stroke sensor 15 for detecting a stroke Sp (operation amount) of the clutch pedal 2. The stroke sensor 15 is provided so as to be pivotable about a sensor pivot shaft 16 disposed in parallel with the pedal pivot shaft 7 at a position upwardly spaced apart from the pedal pivot shaft 7, and includes a bifurcated sensor lever 17 that engages with the pin 9 of the sensor arm 10 and pivots in response to the pivoting of the pedal arm 8, and a rotation angle sensor 18 that detects the pivot angle position of the sensor lever 17. When the clutch pedal 2 is at the start point position, the sensor lever 17 is placed at a pivotal position shown by solid lines in FIG. 1 and in engagement with the pin 9, and when the clutch pedal 2 is at the end point position, the sensor lever 17 is moved by the pin 9 to a pivotal position shown by imaginary lines in FIG. 1. A detection voltage V of the rotation angle sensor 18 is input to an EPB (Electronic Parking Brake) control unit 20.

Figure 2:
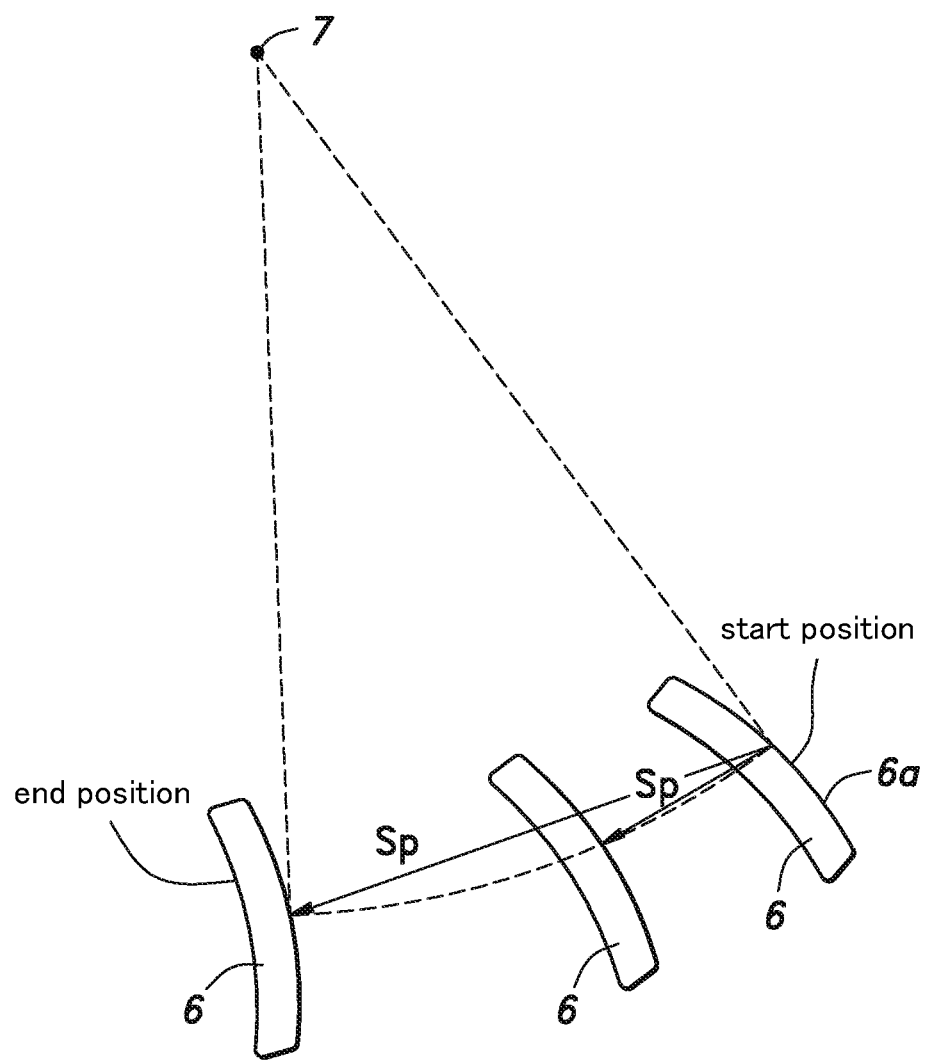
FIG. 2 is an explanatory diagram of a stroke.

It is to be noted here that the stroke Sp of the clutch pedal 2 indicates a moving distance from the pedal part 6 (center of the pedal surface 6a) at the start point position to the pedal part 6 (center of the pedal surface 6a) that has been swung to a certain position as a result of a depressing operation, as shown in FIG. 2. Namely, the stroke Sp when the clutch pedal 2 is at the start point position is 0 mm. To be precise, the moving distance is a length of an arc about the pedal pivot shaft 7. However, since the operation angle range of the clutch pedal 2 is relatively small (smaller than or equal to 90 degrees), the moving distance is substantially the same as the linear distance between the above positions. In the illustrated embodiment, the stroke Sp when the clutch pedal 2 is at the end point position is 135 mm.

Figure 3:
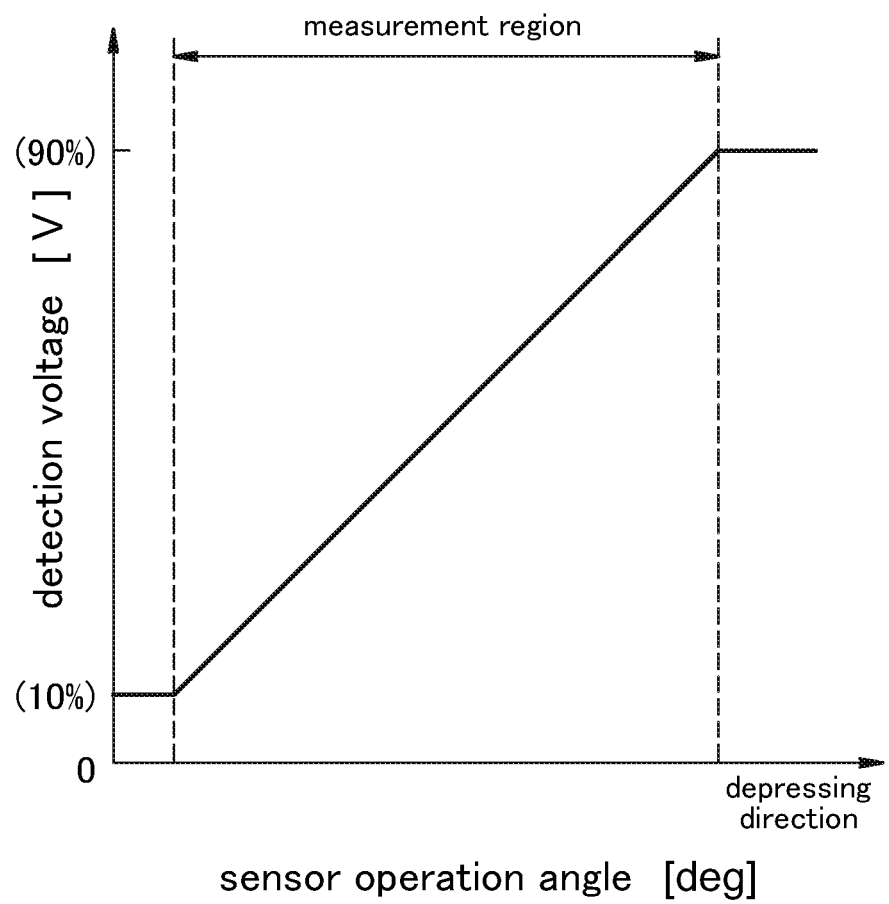
FIG. 3 is a diagram showing a relationship between an operation angle and a detection voltage of a stroke sensor.

As shown in FIG. 3, the measurement region of the rotation angle sensor 18 is a sensor operation angle corresponding to from 10% to 90% of the detection voltage V, and the rotation angle sensor 18 is provided such that the operation range of the clutch pedal 2 is contained in this measurement region. The rotation angle sensor 18 is adapted such that the output detection voltage V has a linear characteristic relative to the stroke Sp of the clutch pedal 2 in the range from 10% to 90% of the detection voltage V, and when the clutch pedal 2 is depressed, the rotation angle sensor 18 outputs a detection voltage V proportional to the stroke Sp.

Figure 4:
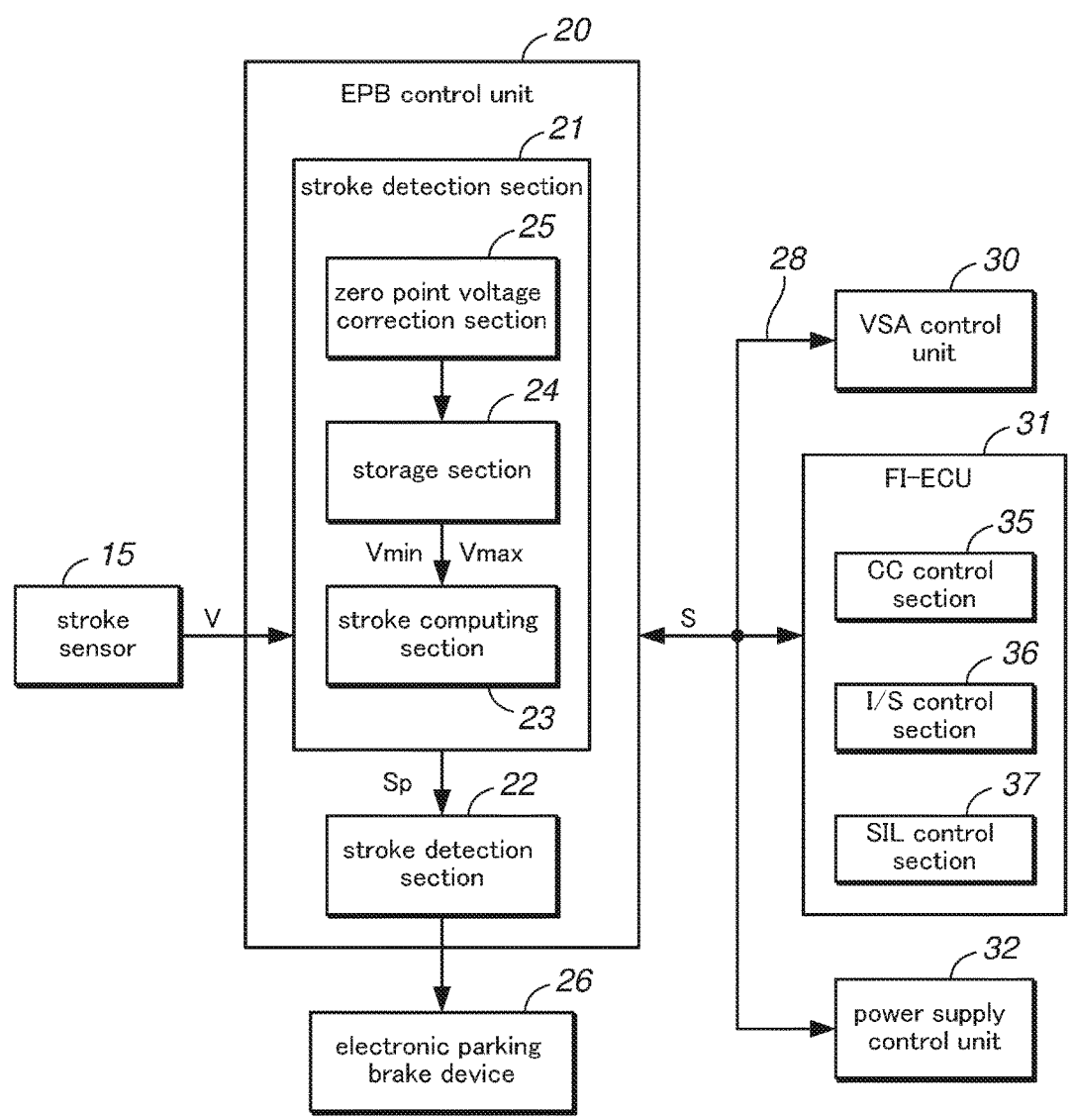
FIG. 4 is a block diagram of an EPB control unit shown in FIG. 1.

As shown in FIG. 4, the EPB control unit 20 includes a stroke detection section 21 that detects the stroke Sp of the clutch pedal 2, and an EPB control section 22 that drive-controls an electronic parking brake device 26. The detection voltage V of the stroke sensor 15 is input to the stroke detection section 21. The stroke detection section 21 is constituted of a stroke computing section 23, a storage section 24 and a zero point voltage correction section 25.

The storage section 24 stores the detection voltage V of the stroke sensor 15 when the clutch pedal 2 is at the start point position and the detection voltage V of the stroke sensor 15 when the clutch pedal 2 is at the end point position as a zero point voltage Vmin (start point detection value) and a maximum detection voltage Vmax (end point detection value), respectively.

The stroke computing section 23 reads in the zero point voltage Vmin stored in the storage section 24, and based on a difference $\Delta V$ between the input detection voltage V of the stroke sensor 15 and the zero point voltage Vmin, computes the stroke Sp of the clutch pedal 2. For example, as shown by a solid line in FIG. 5, when the zero point voltage Vmin stored in the storage section 24 is 1.38V and the maximum detection voltage Vmax stored in the storage section 24 is 3.74V, a span of a detection voltage range Vran defined by the zero point voltage Vmin and the maximum detection voltage Vmax (Vmax−Vmin) is always 2.36V. The stroke computing section 23 computes the stroke Sp such that the stroke Sp increases linearly with an increase of the detection voltage V of the stroke sensor 15 (namely, an increase in the difference $\Delta V$) in the detection voltage range Vran.

The zero point voltage correction section 25 shown in FIG. 4 is configured such that, when the detection voltage V of the stroke sensor 15 deviates from the detection voltage range Vran, the zero point voltage correction section 25 corrects (updates) the zero point voltage Vmin based on an amount of deviation of the detection voltage V from the detection voltage range Vran. Namely, when the detection voltage V falls below the zero point voltage Vmin, the zero point voltage correction section 25 corrects the zero point voltage Vmin based on a deviation value Vd of the detection voltage V from the zero point voltage Vmin (Vd=V−Vmin), and when the detection voltage V exceeds the maximum detection voltage Vmax, the zero point voltage correction section 25 corrects the zero point voltage Vmin based on the deviation value Vd of the detection voltage V from the maximum detection voltage Vmax (Vd=V−Vmax). Further, when correcting the zero point voltage Vmin, the zero point voltage correction section 25 also corrects (updates) the maximum detection voltage Vmax so as to keep the span of the detection voltage range Vran constant.

For example, as shown by a broken line in FIG. 5, in a case where the detection voltage V output when the clutch pedal 2 is at the start point position has changed in a direction toward a value less than the zero point voltage Vmin (namely, in the direction opposite to the depressing direction) to become 1.0V, which is below the zero point voltage Vmin, the deviation value Vd of the detection voltage V from the zero point voltage Vmin becomes −0.38V (=1.0V−1.38V). In the illustrated embodiment, the zero point voltage correction section 25 adds the deviation value Vd as it is to the zero point voltage Vmin, to thereby correct the zero point voltage Vmin to 1.0V (=1.38V+(−0.38V)). Namely, the value of the zero point voltage Vmin is made equal to the value of the detection voltage V that has fallen below the zero point voltage Vmin.

It is to be noted that in a case where the absolute value of the deviation value Vd of the detection voltage V from the zero point voltage Vmin exceeds a failure determination value Ver (0.38V in the present embodiment), namely, in a case where a detection voltage V below 1.0V is output in a state where the zero point voltage Vmin is set at 1.38V, the zero point voltage correction section 25 determines that the deviation value Vd was caused by a failure of the stroke sensor 15, and does not correct the zero point voltage Vmin. Namely, the zero point voltage correction section 25 performs failure determination of the stroke sensor 15 based on the detection voltage V.

Figure 5:
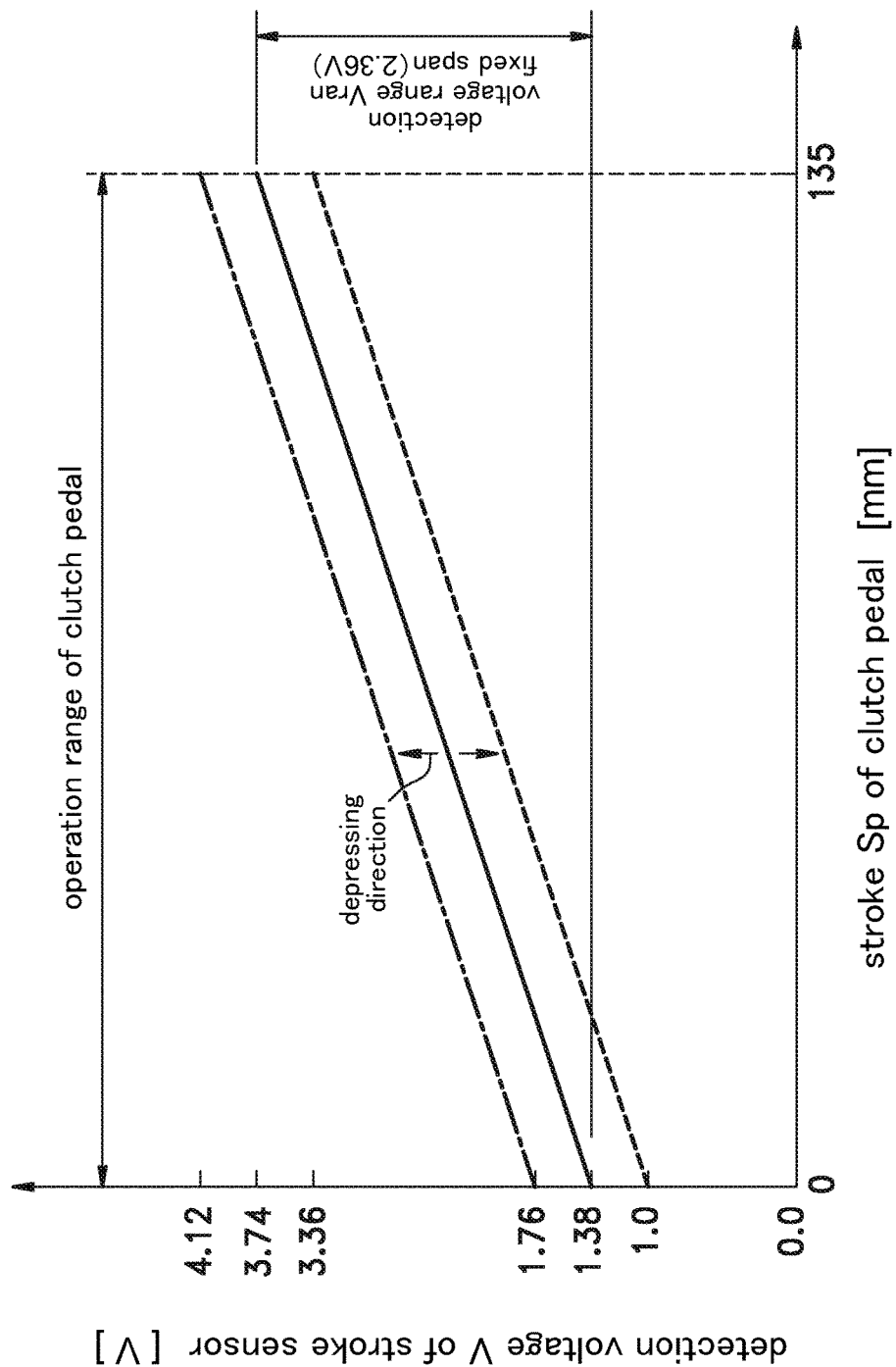
FIG. 5 is a diagram showing a relationship between the detection voltage of the stroke sensor and a stroke.

On the other hand, as shown by a long dashed short dashed line in FIG. 5, in a case where the detection voltage V output when the clutch pedal 2 is at the start point position has changed in a direction toward a value greater than the zero point voltage Vmin (namely, in the depressing direction) to become 1.76V such that when a depressing operation is performed, the detection voltage V becomes 4.12V exceeding the maximum detection voltage Vmax, the deviation value Vd of the detection voltage V from the maximum detection voltage Vmax becomes 0.38V (=4.12V−3.74V). In the illustrated embodiment, the zero point voltage correction section 25 adds the deviation value Vd to the zero point voltage Vmin to thereby correct the zero point voltage Vmin. In doing so, the zero point voltage correction section 25 regards an operation from when the detection voltage V of the stroke sensor 15 exceeded the maximum detection voltage Vmax to when the detection voltage V returned to a value near the zero point voltage Vmin as a single operation, and limits the value to be added following the single operation to a predetermined limit value Vlim (e.g., 0.019V) and corrects the zero point voltage Vmin accordingly. Namely, the zero point voltage correction section 25 corrects the zero point voltage Vmin to 1.399V (=1.38V+0.019V).

If a detection voltage V exceeding the maximum detection voltage Vmax is similarly output in the next operation, the zero point voltage Vmin is corrected to 1.418V (=1.399V+0.019V). Also, in a case where the absolute value of the deviation value Vd of the detection voltage V from the maximum detection voltage Vmax exceeds the failure determination value Ver (0.38V), namely, in a case where a detection voltage V exceeding 4.12V is output in a state where the zero point voltage Vmin is set at 1.38V and the maximum detection voltage Vmax is set at 3.74V, the zero point voltage correction section 25 determines that the deviation value Vd was caused by a failure and does not correct the zero point voltage Vmin.

Referring back to FIG. 4, the EPB control section 22 controls the ON/OFF of the electronic parking brake device 26 based on the stroke Sp of the clutch pedal 2 computed by the stroke detection section 21. For instance, the EPB control section 22 controls the ON/OFF of the electronic parking brake device 26 as follows. When a running vehicle comes to a stop, the EPB control section 22 turns on the electronic parking brake device 26. Further, in a state where the vehicle is stopped with the electronic parking brake device 26 being ON and the shift lever is operated to a running gear (first, second, reverse, etc.), when the depressed clutch pedal 2 is operated in a returning direction to such an extent that the stroke Sp is decreased to a value slightly greater than a clutch connection value, the EPB control section 22 turns off the electronic parking brake device 26.

The EPB control unit 20 is connected with a VSA control unit 30, an FI-ECU 31 (Fuel Injection Electronic Control Unit), a power supply control unit 32, etc. via a CAN (Controller Area Network) 28. The EPB control unit 20 transmits, onto the CAN 28, a stroke ratio S (%) of the clutch pedal 2 obtained based on the zero point voltage Vmin corrected by learning of the zero point voltage correction section 25, together with failure information.

Figure 6:
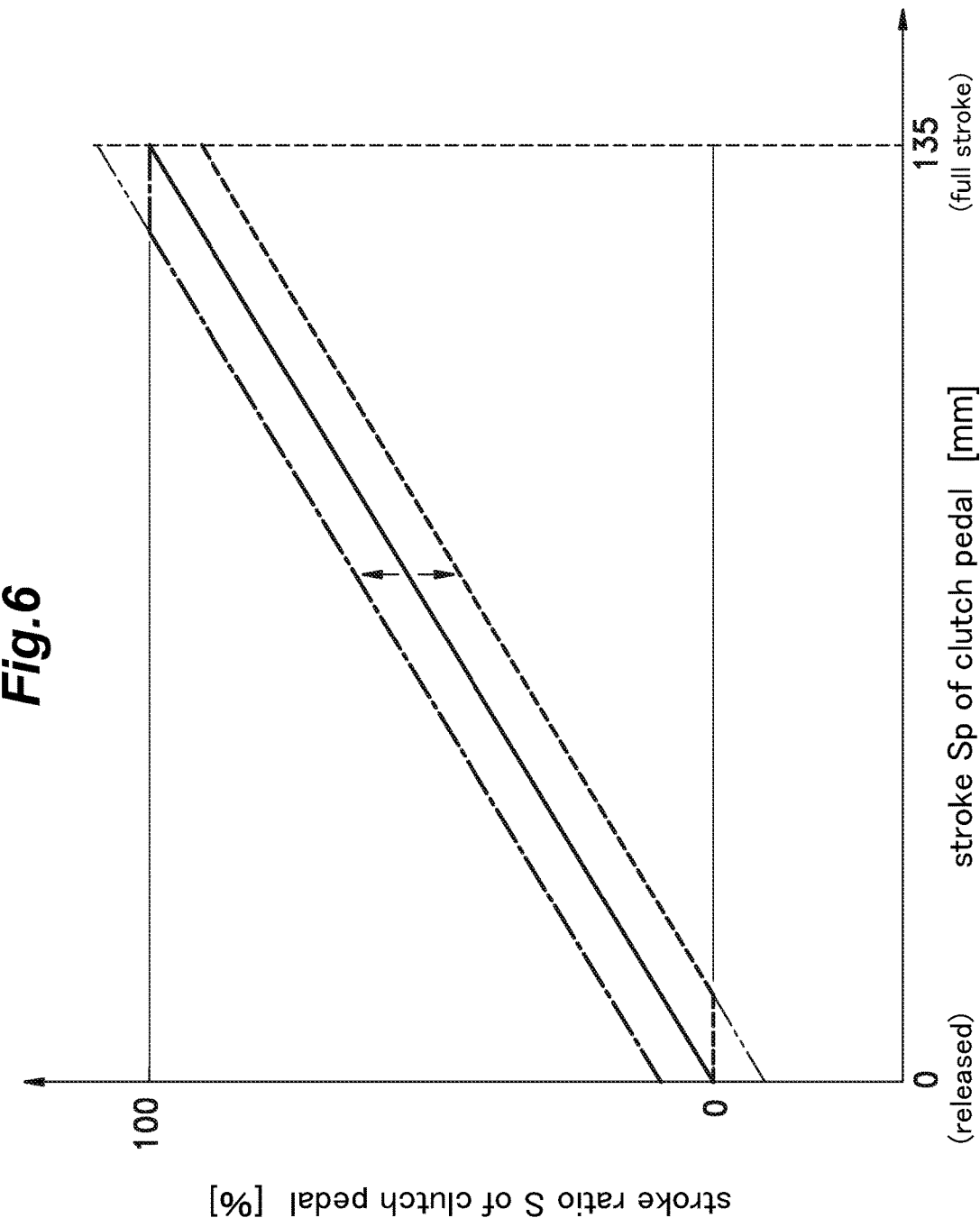
FIG. 6 is a diagram showing a relationship between the stroke of a clutch pedal and a stroke ratio.

As shown by a solid line in FIG. 6, the stroke ratio S of the clutch pedal 2 is 0% when the clutch pedal 2 is located at the start point position without being operated and the stroke Sp is 0 mm, and becomes 100% when the clutch pedal 2 is fully depressed to the end point position and the stroke Sp is 135 mm. For example, in the state where the detection voltage V output when the clutch pedal 2 is at the start point position is 1.0V (the zero point voltage Vmin has not been corrected) as shown by the broken line in FIG. 5, the stroke ratio S of the clutch pedal 2 becomes uniformly zero in the vicinity of the zero point voltage Vmin as shown by a broken line in FIG. 6, though actually the clutch pedal 2 is operated. Even when such a state occurs, the zero point voltage correction section 25 corrects the zero point voltage Vmin, whereby the stroke ratio S shown by the broken line in FIG. 6 is corrected to that shown by the solid line.

On the other hand, in the state where the detection voltage V output when the clutch pedal 2 is at the end point position is 4.12V (the zero point voltage Vmin has not been corrected) as shown by the long dashed short dashed line in FIG. 5, the stroke ratio S of the clutch pedal 2 becomes uniformly 100% in the vicinity of the end point position as shown by a long dashed short dashed line in FIG. 6, though actually the clutch pedal 2 is not operated to the end point position. Even when such a state occurs, the zero point voltage correction section 25 corrects the zero point voltage Vmin gradually with the limit value Vlim for each operation of the clutch pedal 2, whereby the stroke ratio S shown by the long dashed short dashed line in FIG. 6 is gradually corrected to that shown by the solid line.

Referring back to FIG. 4 again, the VSA control unit 30 drive-controls a known brake system for which VSA (Vehicle Stability Assist) control is possible, as a vehicle behavior stabilization control system including an ABS (Antilock Brake System) for preventing wheel lock-up during braking, a TCS (Traction Control System) for preventing wheel spinning during acceleration or the like, or both the ABS and the TCS, and provided with an automatic braking function for yaw moment control during turning, brake assist function, etc.

The FI-ECU 31 includes a CC (Cruise Control) control section 35, an I/S (Idling Stop) control section 36 and an SIL (Shift Indicator Lamp) control section 37. The CC control section 35 performs cruise control in which a predetermined engine output is obtained even when the accelerator pedal is not operated; for example, an engine output is demanded to travel at a constant speed. The US control section 36 controls idling stop such that the engine is turned off when the motor vehicle comes to a stop, to thereby improve the fuel economy and suppress CO2 emission. The SIL control section 37 controls turning on of the shift indicator lamp in accordance with the shift range of the transmission. The FI-ECU 31 makes determination on execution of the cruise control, idling stop or shift indicator lamp control based on the stroke ratio S of the clutch pedal 2 obtained from the EPB control unit 20, and transmits the determination result onto the CAN 28.

The power supply control unit 32 receives, from the CAN 28, a flag relating to the stroke ratio S of the clutch pedal 2 to turn on the shift indicator lamp from the FI-ECU 31, and controls the state of electric conductance in the motor vehicle in accordance with an ignition key operation by the driver, determination result of an immobilizer system, etc.

The VSA control unit 30, the FI-ECU 31 and the power supply control unit 32 each determine, based on the stroke ratio S received from the CAN 28, whether the clutch pedal 2 is in a released state, and controls the corresponding device in accordance with the state of the clutch pedal 2. Conventionally, these devices used a detection switch to determine the release state of the clutch pedal 2, but in the present embodiment, the released state of the clutch pedal 2 can be determined based on the stroke ratio S, and thus, the detection switch becomes unnecessary.

Figure 7:
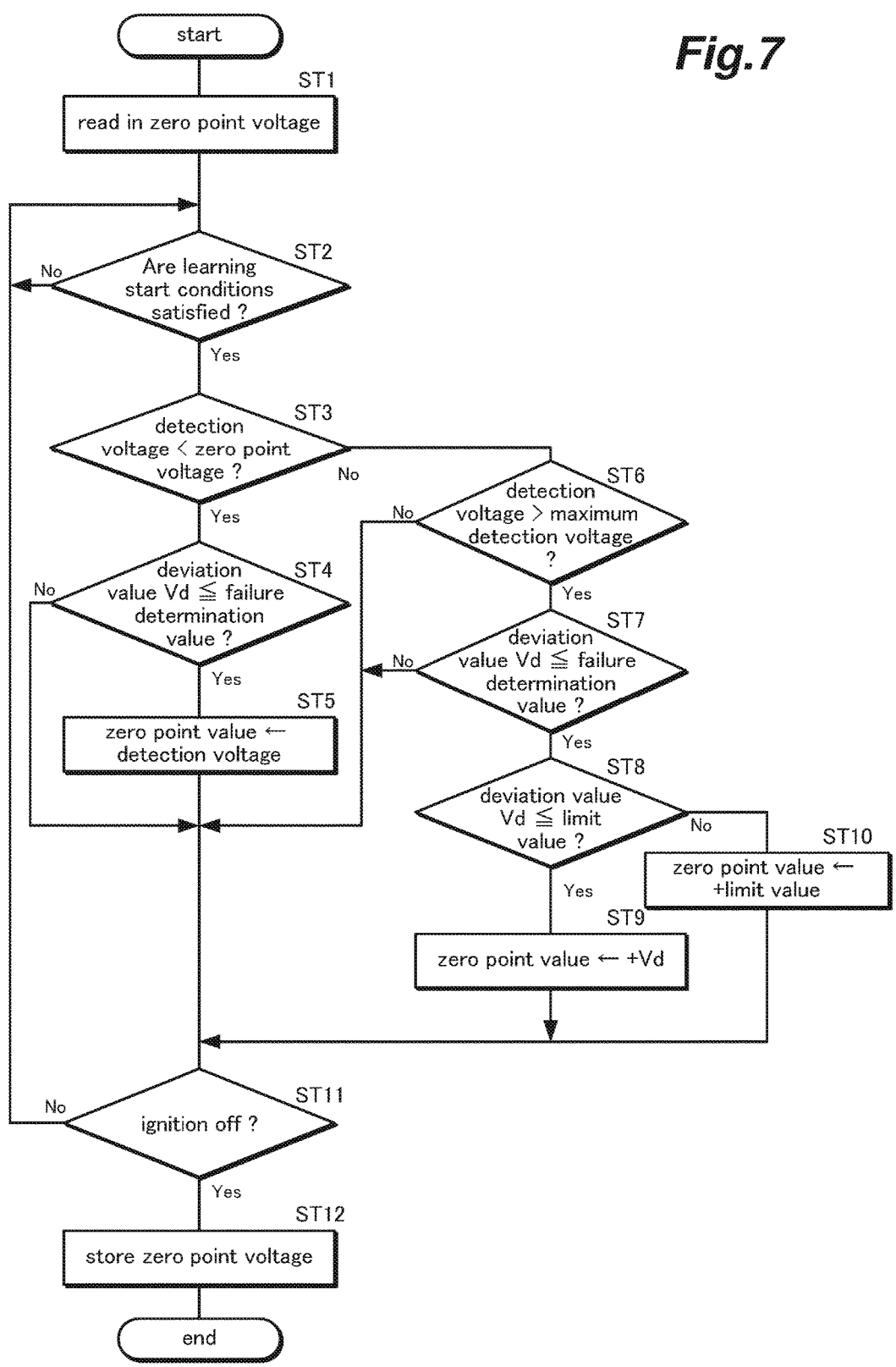
FIG. 7 is a flowchart of a zero point voltage correction process executed by a zero point voltage correction section shown in FIG. 4.

Next, description will be made of the control procedure followed by the zero point voltage correction section 25. When the ignition is turned on by the driver, the stroke detection section 21 starts a zero point voltage correction process, the procedure of which is shown in FIG. 7.

First, the zero point voltage correction section 25 reads in the zero point voltage Vmin stored in the storage section 24 (step ST1). Then, the zero point voltage correction section 25 determines whether learning start conditions are satisfied (step ST2). The learning start conditions include that there is no failure of the stroke sensor 15 and that the detection voltage V of the stroke sensor 15 is in a predetermined learning-feasible range (in the present embodiment, the zero point voltage Vmin is in a range from 1.00V to 1.76V, namely, the maximum detection voltage Vmax is in a range from 3.36V to 4.12V).

If the determination result in step ST2 is No, the zero point voltage correction section 25 repeats the determination of step ST2. On the other hand, if the determination result in step ST2 is Yes, the zero point voltage correction section 25 determines whether the detection voltage V is less than the zero point voltage Vmin (step ST3). If the result of this determination is Yes, the zero point voltage correction section 25 determines whether the absolute value of the deviation value Vd is less than or equal to the failure determination value Ver (0.38V) (step ST4). If the result of this determination is Yes, the zero point voltage correction section 25 corrects the zero point voltage Vmin to a value obtained by adding the deviation value Vd to the zero point voltage Vmin, namely, to the value of the detection voltage V, and then proceeds to step ST11, and if No, proceeds to step ST11 without correcting the zero point voltage Vmin.

If it is found in step ST3 that the detection voltage V is greater than or equal to the zero point voltage Vmin, and hence the determination result is No, the zero point voltage correction section 25 determines whether the detection voltage V is greater than the maximum detection voltage Vmax (step ST6). If the result of this determination is No, the zero point voltage correction section 25 proceeds to step ST11. On the other hand, if the determination result in step ST6 is Yes, the zero point voltage correction section 25 determines whether the absolute value of the deviation value Vd is less than or equal to the failure determination value Ver (0.38V) (step ST7). If the result of this determination is No, the zero point voltage correction section 25 proceeds to step ST11 without correcting the zero point voltage Vmin, and if Yes, the zero point voltage correction section 25 determines whether the deviation value ΔV is less than or equal to the limit value Vlim (0.019V) (step ST8). If the determination result in step ST8 is Yes, the zero point voltage correction section 25 corrects the zero point voltage Vmin to a value obtained by adding the deviation value Vd to the zero point voltage Vmin (step ST9) and proceeds to step ST11. On the other hand, if the determination result in step ST8 is No, the zero point voltage correction section 25 corrects the zero point voltage Vmin to a value obtained by adding the limit value Vlim (0.019V) to the zero point voltage Vmin (step ST10) and proceeds to step ST11.

In step ST11, the zero point voltage correction section 25 determines whether the ignition is turned off, and if the result of this determination is No, repeats the above process from step ST2. On the other hand, if the determination result in step ST11 is Yes, the zero point voltage correction section 25 saves the corrected zero point voltage Vmin in the storage section 24 by overwriting (step ST12) and terminates the process.

In the stroke detection section 21 (FIG. 4) configured as above, the zero point voltage correction section 25 not only corrects the zero point voltage Vmin on the basis of the deviation value Vd of the detection voltage V from the zero point voltage Vmin in step ST5 when the detection voltage V falls below the zero point voltage Vmin and the determination result in step ST3 becomes Yes, but also corrects the zero point voltage Vmin on the basis of the deviation value Vd of the detection voltage V from the maximum detection voltage Vmax in step ST9 when the detection voltage V exceeds the maximum detection voltage Vmax and the determination result in step ST6 becomes Yes. Therefore, as shown in FIG. 5, not only in the case where the detection voltage V of the stroke sensor 15 when the clutch pedal 2 is at the start point position is shifted toward the value indicated by the broken line such that it becomes less than the zero point voltage Vmin, but also in the case where the detection voltage V is shifted toward the value indicated by the long dashed short dashed line such that it becomes greater than the zero point voltage Vmin, the zero point voltage Vmin is corrected.

Also, the clutch pedal 2 is operated to the end point position almost each time it is operated. Therefore, the process of determining whether the detection voltage V is greater than the maximum detection voltage Vmax in step ST6 functions effectively. Namely, as shown in FIG. 5, in the case where the detection voltage V of the stroke sensor 15 is shifted toward a greater side as indicated by the long dashed short dashed line, whether the detection voltage V when the clutch pedal 2 is at the end point position is greater than the maximum detection voltage Vmax is checked almost each time an operation is performed. Thereby, in the case where the detection voltage V is shifted in the operation direction, the shifting is distinguished from a phenomenon caused by the driver's operation or the like, and the zero point voltage Vmin is corrected swiftly, whereby the stroke Sp of the clutch pedal 2 is detected accurately. Therefore, the EPB control section 22 can turn off the electronic parking brake device 26 at an appropriate timing. Further, the VSA control unit 30, the FI-ECU 31, the power supply control unit 32 and so on also can conduct appropriate control.

In the present embodiment, when the detection voltage V exceeds the maximum detection voltage Vmax (step ST6: Yes), the zero point voltage correction section 25 regards an operation from when the detection voltage V of the stroke sensor 15 exceeded the maximum detection voltage Vmax to when the detection voltage V returned to the zero point voltage Vmin as a single operation, and in step ST10, limits the value to be added following the single operation to the predetermined limit value Vlim (0.019V) and corrects the zero point voltage Vmin. Therefore, in the case where the detection voltage V of the stroke sensor 15 when the clutch pedal 2 is at the start point position is shifted in the depressing direction by more than the limit value Vlim (step ST8: No), the zero point voltage Vmin is corrected gradually with each single operation. This avoids a situation that when the detection voltage V of the stroke sensor 15 affected by noise or the like, the zero point voltage Vmin is corrected rapidly in the depressing direction with a single operation such that an operation near the start point position becomes unable to be recognized when the next operation is performed.

In the present embodiment, when the detection voltage V falls below the zero point voltage Vmin (step ST3: Yes), the zero point voltage correction section 25 corrects the zero point voltage Vmin in step ST5 by adding the deviation value Vd as it is, without limiting the value to be added. Thereby, if there is a shift of the zero point voltage Vmin at an early stage, the shift is corrected quickly.

In the present embodiment, when the detection voltage V falls below the zero point voltage Vmin by more than the predetermined failure determination value Ver (step ST4: No) and when the detection voltage V exceeds the maximum detection value Vmax by more than the predetermined failure determination value Ver (step ST7: No), the zero point voltage correction section 25 maintains the zero point voltage Vmin, without correcting it. Thus, if an abnormal deviation value Vd exceeding the failure determination value Ver is detected as a result of some sort of failure of the stroke sensor 15, the zero point voltage Vmin is not corrected. Thereby, operability when the stroke sensor 15 is in failure is ensured.

A specific embodiment has been described in the foregoing, but the present invention is not limited to the above embodiment and can be modified in various manners. For instance, in the above embodiment, the device for detecting an operation amount was described as a clutch pedal unit 1 for a vehicle as an example, but the device may be used widely as a clutch pedal unit 1 for a railway vehicle, airplane, marine vessel, etc. or as an accelerator pedal device or a brake pedal device for the same. Besides, the concrete structure, arrangement, number, shape or angle of each member or part and the concrete procedure or order of the controls can be modified appropriately within the spirit of the present invention. Further, not all of the structural elements and processing elements for various controls shown in the foregoing embodiments are necessarily indispensable, and they may be selectively used as appropriate.

GLOSSARY 1 clutch pedal unit
2 clutch pedal (operation member)
6 pedal part
7 pedal pivot shaft
8 pedal arm
15 stroke sensor (position detector)
16 sensor pivot shaft
17 sensor lever
18 rotation angle sensor
20 EPB control unit
21 stroke detection section
22 stroke detection section
23 stroke computing section (operation amount computing section)
24 storage section
25 zero point voltage correction section (start point detection value correction section)
Sp stroke (operation amount) of clutch pedal 2
V detection voltage
ΔV difference between the detection voltage V and the zero point voltage Vmin
Vlim limit value
Vmin zero point voltage (start point detection value)
Vmax maximum detection voltage (end point detection value)
Vran detection voltage range
Ver failure determination value
Vd deviation value of the detection voltage V from the zero point voltage Vmin or the maximum detection voltage Vmax

The invention claimed is:

1. A device for detecting an operation amount of an operation member, comprising:
an operation member provided so as to be moveable within a fixed operation range from a start point position to an end point position;
a position detector that outputs a detection value varying in accordance with a position of the operation member;
a storage section that stores the detection values of the position detector when the operation member is at the start point position and when the operation member is at the end point position as a start point detection value and an end point detection value, respectively;
an operation amount computing section that, based on a difference between the detection value of the position detector and the start point detection value, computes an operation amount of the operation member; and
a start point detection value correction section that, when the detection value of the position detector falls below the start point detection value, corrects the start point detection value by adding thereto a first deviation value of the detection value from the start point detection value, and when the detection value of the position detector exceeds the end point detection value, corrects the start point detection value by adding thereto a second deviation value of the detection value from the end point detection value.

2. The device for detecting an operation amount of an operation member according to claim 1, wherein, when the detection value of the position detector exceeds the end point detection value, the start point detection value correction section regards the operation from when the detection value of the position detector exceeds the end point detection value to when the detection value returns to near the start point detection value as a single operation, and limits the second deviation value to be added to the start point detection value that is corrected following the single operation to a predetermined limit value.

3. The device for detecting an operation amount of an operation member according to claim 2, wherein, when the detection value of the position detector falls below the start point detection value, the start point detection value correction section corrects the start point detection value without limiting the first deviation value to be added thereto.

4. The device for detecting an operation amount of an operation member according claim 1, wherein when the detection value of the position detector falls below the start point detection value by more than a predetermined failure determination value and when the detection value of the position detector exceeds the end point detection value by more than a predetermined failure determination value, the start point detection value correction section does not correct the start point detection value and maintains the same.

5. The device for detecting an operation amount of an operation member according to claim 1, wherein:
the operation member consists of a clutch pedal;
the position detector consists of a stroke sensor for detecting a stroke of the clutch pedal;
the clutch pedal comprises a pedal arm provided so as to be pivotable about a pedal pivot shaft and a pedal part provided at a free end portion of the pedal arm and to be operated by a driver; and
the stroke sensor comprises a sensor lever provided so as to be pivotable about a sensor pivot shaft disposed in parallel with the pedal pivot shaft at a position apart from the pedal pivot shaft such that the sensor lever pivots in accordance with pivoting of the pedal arm, and a rotation angle sensor for detecting a pivoting angle of the sensor lever.

6. An electronic parking brake control unit, comprising:
the device for detecting an operation amount of an operation member according to claim 5; and
an electronic parking brake control section that drive-controls an electronic parking brake device based on at least the stroke of the clutch pedal detected by the stroke sensor,
wherein the electronic parking brake control section turns off the electronic parking brake device on the basis of the stroke of the clutch pedal.

* * * * *